United States Patent
Merkle

(10) Patent No.: US 6,330,549 B1
(45) Date of Patent: *Dec. 11, 2001

(54) PROTECTED SHAREWARE

(75) Inventor: Ralph C. Merkle, Sunnyvale, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/960,867

(22) Filed: Oct. 30, 1997

(51) Int. Cl.$^7$ .................................................. G06F 17/60
(52) U.S. Cl. ............................... 705/51; 713/156; 705/52
(58) Field of Search ............................... 380/25, 4, 282; 713/156; 705/56, 59, 55, 51, 52

(56) References Cited

U.S. PATENT DOCUMENTS

| | | | |
|---|---|---|---|
| 4,446,519 | * 5/1984 | Thomas | 364/300 |
| 4,740,890 | * 4/1988 | William | 364/200 |
| 4,796,220 | * 1/1989 | Wolfe | 364/900 |
| 4,827,508 | 5/1989 | Shear | 380/4 |
| 4,977,594 | 12/1990 | Shear | 380/4 |
| 5,005,200 | * 4/1991 | Fischer | 380/30 |
| 5,010,571 | 4/1991 | Katznelson | 380/4 |
| 5,050,213 | 9/1991 | Shear | 380/25 |
| 5,222,134 | * 6/1993 | Waite et al. | 380/4 |
| 5,235,642 | * 8/1993 | Wobber et al. | 713/156 |
| 5,247,575 | 9/1993 | Sprague et al. | 380/9 |
| 5,421,006 | * 5/1995 | Jablon et al. | 395/575 |
| 5,490,216 | * 2/1996 | Richardson, III | 705/59 |
| 5,553,143 | 9/1996 | Ross et al. | 380/25 |
| 5,586,186 | * 12/1996 | Yuval et al. | 380/30 |
| 5,625,690 | * 4/1997 | Michel et al. | 705/53 |
| 5,708,709 | * 1/1998 | Rose | 705/59 |
| 5,745,678 | * 4/1998 | Herzberg et al. | 713/200 |
| 5,754,761 | * 5/1998 | Willsey | 713/200 |
| 5,982,892 | * 11/1999 | Hicks et al. | 705/51 |

FOREIGN PATENT DOCUMENTS

| | | |
|---|---|---|
| 0 778 512 A2 | 6/1997 | (EP) . |
| 0 803 789 A2 | 10/1997 | (EP) . |
| WO 97/14085 | 4/1997 | (WO) . |

OTHER PUBLICATIONS

European Search Report for Eurpean Patent Publication EP 0 913 757 A2, Dec. 21, 1999.

Mori, Ryoichi; Kawahara, Masaji. "Superdistribution: The Concept and the Architecture." *The Transactions fo the IEICE*; vol. E 73; No. 7; Jul. 1990; pp. 1133–1146.

Mori, Ryoichi; Kawahara, Masaji. "Superdistribution: An Electronic Infrastructure for the Economy of the Future." *Transactions of Information Processing Society of Japan*, vol. 38, No. 7, Jul. 1997, pp. 1465–1472.

* cited by examiner

Primary Examiner—Albert Decady
Assistant Examiner—Steve Kabakoff
(74) Attorney, Agent, or Firm—Thomas M. Webster; Phuong-Quan Hoang

(57) ABSTRACT

The functionality of "protected shareware" is controlled by digitally signed messaging protocol. Protective code within the shareware controls the functionality of the shareware in response to authorization messages which are supplied directly or indirectly by the shareware supplier. These messages are digitally signed in whole or part by or on behalf of the shareware supplier using the supplier's secret signing key. The shareware, in turn, includes the public checking key for this digital signature of the supplier, thereby enabling the protective code to authenticate any such authorization message before acting in reliance upon it. The shareware includes an integrity self-checking routine which is run at appropriate times to ensure that shareware, including its protective code, is in an anticipated state. Typically this is equivalent to a finding that the code has not been altered, but it is conceivable that the code might be dynamically altered in some authorized (i. e., "anticipated") way.

14 Claims, 5 Drawing Sheets

PROTECTED SHAREWARE

FIELD OF THE INVENTION

This invention relates to countermeasures for combating computer software "piracy" and, more particularly, to techniques for protecting executable computer programs (including informally distributed programs) against unauthorized use.

BACKGROUND OF THE INVENTION

The distribution of computer software fundamentally involves two parties: the software author or the author's successor in interest (i.e., the "supplier") and a prospective end user. In a standard commercial transaction, the end user usually is motivated to acquire a legitimate right to use identified software in a particular computing environment on a satisfactory schedule, while the supplier generally is interested in receiving an acceptable return on the transaction. Various formalized distribution strategies, such as the use of retail outlets, direct sales, mail order distribution, etc., have been developed to resolve the competing interests of these parties, but many of the more popular distribution techniques tend to burden the distribution process with costs which add little, if any, value to the underlying software. For example, software suppliers frequently incur packaging and handling costs which add no substantive value to the software, but which add to the cost of delivering the software to the end users.

Furthermore, conventional commercial software distribution strategies too often fail to provide adequate protection against unauthorized use of the software. A few suppliers still "copy protect" their program offerings, but this practice has fallen into general disfavor because it restricts the ability of legitimate users to configure and backup their computing systems in accordance with their individual needs and preferences. Thus, some software suppliers have elected to forego the use of built in anti-piracy mechanisms all together, while others have adopted inconvenient countermeasures that are somewhat less objectionable to the user community. For example, some programs are designed to run only if the host computer has a program specific "dongle" on a designated port, other programs are designed to run only if the user correctly responds to a query which tends to verify the legitimacy of the user (such as a query requesting information from a specific page of the program documentation), and still other programs are designed to run only after they have been "personalized" with, say, a user name and/or address.

Computer "shareware" is distributed more informally and with less overhead cost than standard commercial software. The user-to-user distribution process that shareware tends to promote is at least arguably better aligned with the fundamental character of executable computer programs than the direct marketing/retail distribution model that now dominates the distribution of commercial software because an executable program essentially is intangible information which is represented by a pattern of binary "1's" and "0's." Others have recognized the potential of shareware as a vehicle for distributing commercial software, but it has been difficult to capitalize in the commercial market on the efficiency and effectivity of this distribution model because there has been no easily implemented, built-in protection mechanism for enforcing the software suppliers' compensation expectations.

Mori et al., "Superdistribution: The Concept and Architecture," *The Transactions of the IEICE,* Vol. E73, No. 7, July 1990, pp. 1133–1146 addresses this enforcement issue, but it suggests encrypting the software. Unfortunately, however, when an ordinary key encryption technique is employed for encrypting software which is subject to unrestricted distribution for use by any user, then the key for decrypting the software must necessarily also be available to any user. Mori et al., propose the use of stringent physical security measures for reducing the risk of divulging key contents to the users, but system security is questionable at best if a single common key must be available to all host computers on which the encrypted shareware might run. If, on the other hand, multiple keys are used, then multiple versions of the software must be created and distributed which is often a severe inconvenience. Also see, Mori et al., "Superdistribution: An Electronic Infrastructure for the Economy of the Future", *Trans. of Information Proc. Soc. of Japan,* Vol. 38. No. 7, July 1997, pp 1465–1472.

Consequently, there still is a need for a cost effective response to the challenge of affording computer software suppliers adequate protection against unauthorized use of their executable computer program offerings when unrestricted distribution and installation of these programs is permitted (i.e., when a shareware distribution model is employed). For commercial applications, it would be desirable to have a system solution for automatically carrying out at least the basic elements of a commercial transaction, including communicating the supplier's asking price for program usage rights to the prospective user, registering the user's payment or promise to pay, and denying or revoking the user's usage rights if payment is not timely received. Furthermore, it would be advantageous for this solution to perform these functions even if the system resources which enforce the supplier's interests only have intermittent access to the host computer on which the user decides to run the shareware program.

SUMMARY OF THE INVENTION

To satisfy the foregoing goals, in accordance with this invention, the functionality of "protected shareware" is controlled by digitally signed messaging protocol. Protective code within the shareware controls the functionality of the shareware in response to authorization messages which are supplied directly or indirectly by the shareware supplier. These messages are digitally signed in whole or part by or on behalf of the shareware supplier using the supplier's secret signing key. The shareware, in turn, includes the public checking key for this digital signature of the supplier, thereby enabling the protective code to authenticate any such authorization message before acting in reliance upon it. The shareware includes an integrity self-checking routine which is run at appropriate times to ensure that shareware, including its protective code, is in an anticipated state. Typically this is equivalent to a finding that the code has not been altered, but it is conceivable that the code might be dynamically altered in some authorized (i.e., "anticipated") way.

BRIEF DESCRIPTION OF THE DRAWINGS

Additional objects and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to a certain embodiment and some potentially interesting extensions, it is to be understood that there is no intent to limit it thereto. On the contrary, the intent is to cover all modifications, alternatives and equivalents falling within the spirit and scope of the invention as defined by the appended claims.

Figure 1:
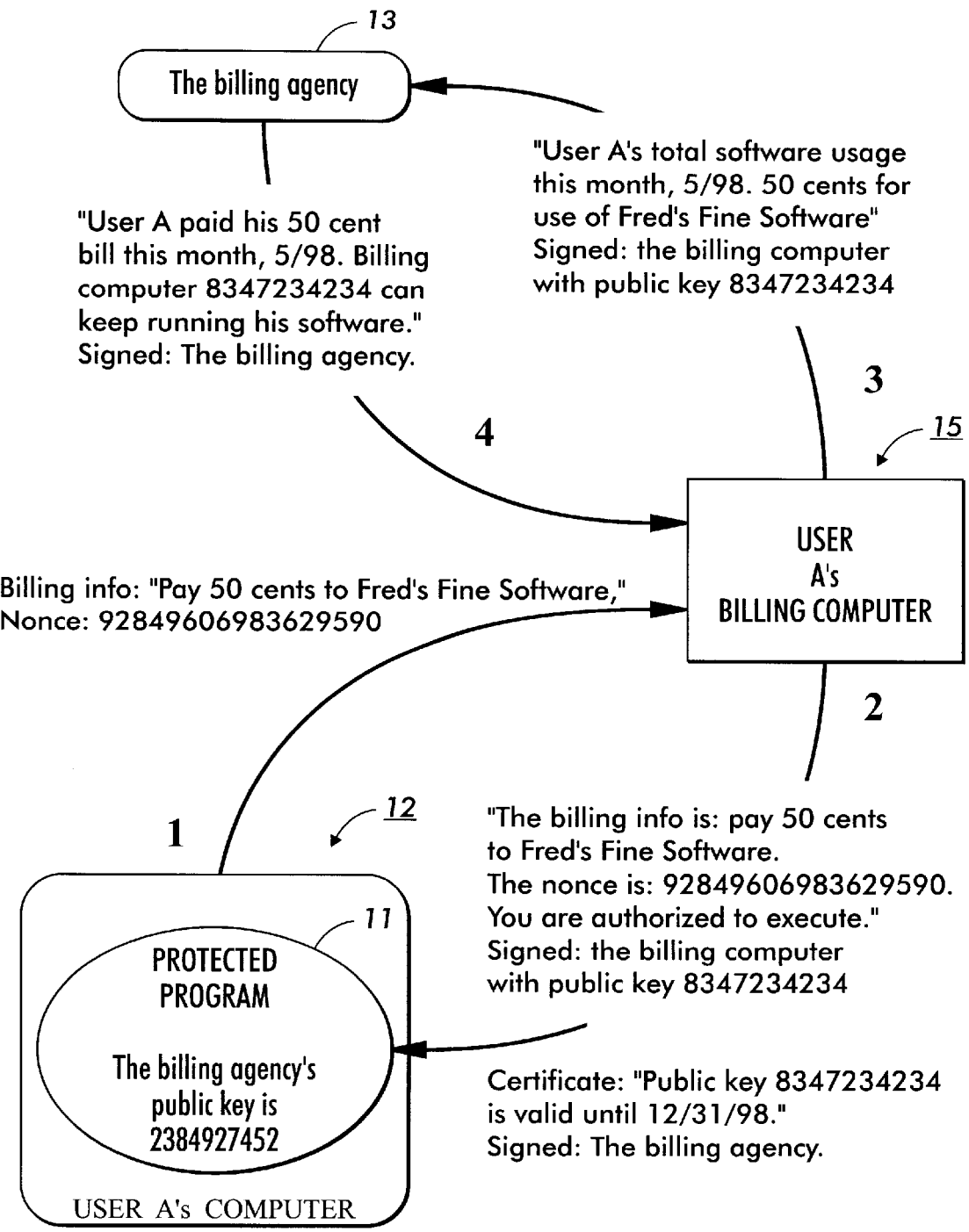
FIG. 1 diagrammatically illustrates a process for applying the present invention to commercial shareware.

Turning now to the drawings, and at this point especially to FIG. 1, a somewhat elaborated embodiment of the invention is shown to illustrate a suitable implementation for simple commercial applications. However, at a more fundamental level, it will be observed that an executable computer program 11 that is protected in whole or part in accordance with this invention includes embedded protective code which interacts with the existing state of the runtime environment for the program 11 in accordance with predetermined rules. These rules, in turn, are selected to cause the protective code to modify the functionality of the program 11 in predetermined ways as a function of predefined, recognizable changes in the state of the runtime environment.

For example, in a relatively straightforward application of this invention, the protective code might simply limit the functionality of the protected program 11 unless and until an authorization message is received, directly or indirectly, from a source 13 which is trusted by the program supplier, such as a supplier controlled computer. In practice, the communication channel between the protected program 11 and the trusted source 13 may not be secure, so the source 13 suitably authenticates each of the authorization messages that it issues on behalf of the program supplier by digitally signing each of them with the program supplier's secret signing key. Then, to enable the protective code for the program 11 to verify the authenticity of any apparent authorization message that it receives prior to acting in reliance on it, the protected program 11 includes the public checking key for the supplier's secret signing key. This public checking key may be authenticated by the integrity self-check. Alternatively, the program 11 may include a hash value for this public checking key and have provision for authenticating the public checking key from this hash value. Moreover, still other known authentication methods can be used to authenticate the supplier's public checking key.

As will be appreciated, the interaction between the protective code and the runtime environment for the protected program 11 need not be a simple binary function. Instead, the protective code may give the user access to incrementally differing functional performance capabilities of the program 11 in response to different prespecified states of the runtime environment. Furthermore, the protective code may be programmed to modify its response to any one or more of the recognizable states of the runtime environment for the program 11 as a function of time and/or as a function of any other appropriately monitored variable. For instance, the protective code may be programmed to engage the source 13 in a re-authorization process under predetermined conditions, such as after the protected program 11 has been used pursuant to a prior authorization for a fixed period of real time or run time, or upon the arrival of a date certain.

In keeping with one of the important features of this invention, provision is made for reducing the risk of the protective code for the program 11 from being bypassed or overridden. To this end, the protected program 11 advantageously includes an integrity self-checking mechanism which invokes predetermined countermeasures (e.g., functionally inhibiting the protected program 11 and/or launching warning messages to the program supplier or the supplier's agent, such as the trusted source 13) if it is found that the integrity of the program 11 has been compromised. For example, the protected program 11 might include a check sum routine for computing a sum over the existing version of the program code at more or less randomly selected times and for then comparing each of these computed sums against a precomputed integrity reference so that appropriate countermeasures can be taken if there is any discrepancy. While this integrity self-checking may not provide fail-safe protection for the protective code, the self-checking may be sufficiently sophisticated to create a meaningful economic barrier against code altering attacks. For instance, a series of integrity checks can be implemented so that every integrity check, except for the last, is monitored by the next integrity check in this series. As will be understood, the code for implementing such an integrity check can be embedded virtually anywhere within the protected program 11 as a distributed or non-distributed routine.

The issuance of a properly authenticated authorization message by the source 13 may be preconditioned upon the source 13 being directly or indirectly notified that there is at least apparent compliance with certain prerequisites. Accordingly this invention can be employed for protecting executable computer programs against unauthorized use whenever the suppliers of such programs are prepared to grant program usage rights subject to apparent compliance with predetermined, monitorable conditions. It may not be practical or even feasible to provide absolute compliance guarantees, but compliance assurances of sufficient reliability to reasonably protect the program suppliers' interests usually can be provided. Therefore, this invention may result in greater reliance on the shareware software distribution model, including by program suppliers who are specifically interested in being paid for the use of their programs.

In keeping with the commercial flavor of the illustrated embodiment, the source 13 of the digitally signed authorization messages is shown as being a central billing agency which represents the interests of the supplier of the protected program 11, possibly together with the interests of the suppliers of other similarly protected programs (not shown). Prospective users of the protected program 11 could be required to contact this billing agency 13 for authorization prior to being given access to the protected features of the program 11. However, such a pre-approval process might be found to be too restrictive and could even prove to be counterproductive because a substantial portion of the prospective users may not have convenient, more or less real time access to the billing agency 13. Thus, an authorization process which requires only occasional interaction with the central billing agency 13 is favored. For example, a process that involves regularly scheduled contact, such as monthly contact, with the billing agency 13 may strike a reasonable balance between the avoidance of user inconvenience and the protection of the program supplier's interests.

Figure 2:
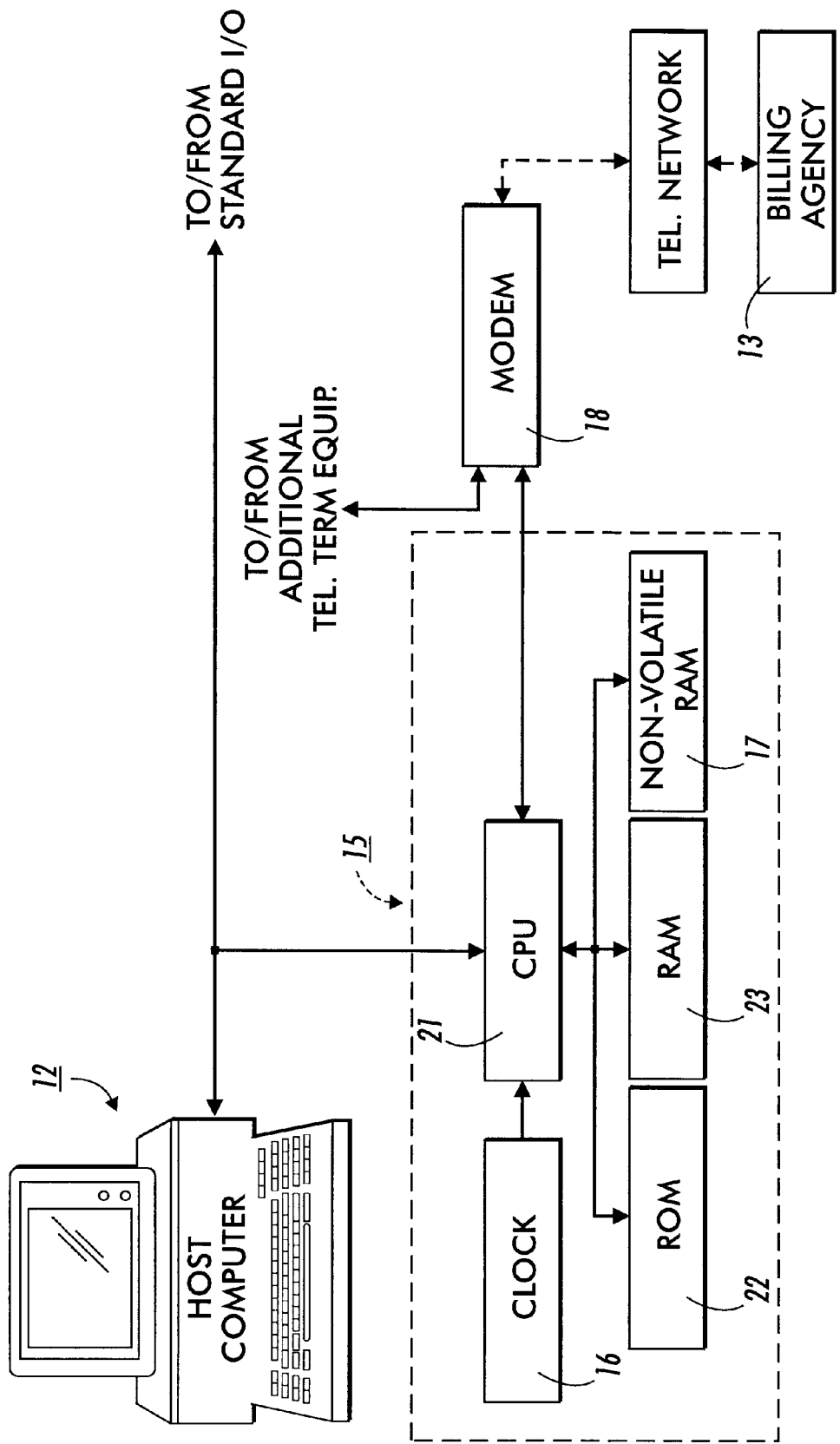
FIG. 2 schematically illustrates a hardware implementation of the process shown in FIG. 1.

To give the program supplier some flexibility in establishing and revising the terms and conditions that govern an authorized use of a protected program, such as the program 11, provision is made for storing a selected set of accounting routines in each prospective user's local computing environment (i.e., in the user's host computer 12 or in a peripheral unit, as at 15 in FIG. 2, that is interfaced with the computer 12 as more fully described hereinbelow). The protected program 11, in turn, includes calls to preselected ones of these routines for communicating the supplier's terms and conditions for authorized use of the program 11 to the prospective user, such as via the standard display interface of the computer 12, and for recording the user's acceptance and/or rejection of this offer in a suitable memory. For example, the supplier might specify that the protected program can be used for 30 days at no charge and establish a $50 annual or paid-up license fee for any use beyond this initial free trial period. As will be understood, a clock, such as shown at 16 in FIG. 2, is a useful tool to have for tracking the time periods specified by such offers, but the supplier's expectations and the user's acceptance of such an offer otherwise are self-defined. Thus, additional calls to the accounting routines are included in the protected program 11 for causing data pertaining to any usage of the protected program 11 to be recorded in tamper resistant, non-volatile memory, such as the non-volatile random access memory (RAM) 17 in FIG. 2. This usage data, in turn, is communicated to the central billing agency 13 on a selected schedule via a suitable communication link. For example, a modem 18 may be employed for communicating the usage data to the billing agency via the public switched telephone network.

Alternatively, the accounting and billing functions could be performed internally to the user's computer 12. This could be done by supplementing an ordinary personal computer or workstation with a secure kernel that operates with protected memory which is inaccessible to the user except through the approved accounting routines. It is believed that programmers who are generally familiar with the concepts underlying such software could readily implement a secure process for handling the limited task of billing information in software. This, of course, would reduce the cost and complexity of any special purpose hardware that might be required to carry out this invention.

As illustrated, however, the computer 12 (e.g., a personal computer, a computer workstation, or any other type of stored program controlled computer) of each prospective user of the protected program 11 has a serial or parallel data port which is interfaced with a special purpose billing computer 15. As shown in further detail in FIG. 2, this billing computer 15 has a processor 21 for managing all memory transactions involving the non-volatile RAM 17, a read-only memory (ROM) 22, and some additional volatile or non-volatile RAM 23. The non-volatile RAM 17 stores the usage data, and the ROM 22 stores the accounting routines. Thus, to prevent unauthorized manipulation of this information, and of any "scratch pad" data that may be written into the RAM 23, the billing computer 15 advantageously is designed to be "tamper resistant," using any of the known techniques for providing such tamper resistance. The clock 16 then is desirably included in the billing computer 15 to take advantage of this tamper resistance. The modem 18, on the other hand, may be internal of or external to the billing computer 15. If an internal modem is employed, it suitably is plugged into a standard telephone interface (not shown) and configured to allow telephone signals to pass to and from other equipment (also not shown) when it is in an idle state. In practice, it may be most cost effective to use embedded processor technology to implement the billing computer 15 as a "single chip" computer.

Conceivably, an attack against the billing computer 15 could result in the divulgation of its secret signing key. Even then, however, the protected program 11 could protect itself against a fraudulent manipulation of the date as known to the billing computer 15 by checking the expiration date on the authentication certificates that it receives from the billing agency 13 via the billing computer 15 against a date inferred from its operating environment, such as by checking the dates on the most recent data files. The use of these authenticating certificates is describe in some additional detail hereinbelow.

Returning to FIG. 1, communications between the billing agency 13 and is the billing computer 15 generally are carried by unsecure communication links. Thus, to ensure the integrity of the information they exchange, the billing agency 13 and the billing computer 15 typically not only digitally sign the messages they transmit to each other with their respective secret signing keys, but also have a priori knowledge of each others public checking keys so that they can validate those messages upon receipt.

If desired, a software program (not shown) can be provided to enable the user to interrogate the billing computer 15 for data relating to the current or accumulated usage charges that the user has incurred, the payment status of the user's account, etc. This program may be a stand alone program or a utility that is included in the protected program 11. The user is merely given tamper resistant, read only access to the billing data, so the billing interrogation program need not be secure.

The authenticity of the message traffic between the billing agency 13 and the billing computer 15 is assured by the above-described digital signature protocol. However, there still is a risk of a successful "spoofing" attack against the protected program 11, unless provision is made for authenticating any message which purports to authorize the user's computer 12 to execute any of the protected code of the program 11. For example, a fraudulent authorization message might be communicated to the computer 12 by an imitator (not shown) of the billing computer 15 whose behavior would be unpredictable at best. As previously pointed out, the public checking key for the digital signature of the billing agency 13 (i.e., the supplier's digital signature) is easily embedded in all unaltered copies of the protected program 11. In this embodiment, however, the protected program 11 indirectly communicates with the central billing agency 13 via the billing computer 15. Therefore, to enable the protected program 11 to use the billing agency's public checking key for validating authorization messages which appear to the host computer 12 to be from the billing computer 15, one or more of the messages that the billing computer 15 communicates to the host computer 12 includes a certificate or the like which is digitally signed by the billing agency 13. For example, as shown, this certificate passes the public checking key for the billing computer's secret signing key to the protected program 11 while certifying the validity of the public checking key for a limited time. Thus, the program 11 can use this public checking key to authenticate the digitally signed messages that it receives from the billing computer 15, unless and until the billing agency's certification of the billing computer 15 expires As a general rule, it is needlessly inefficient for the billing agency 13 to actively participate in preparing each and every authorization message that is transmitted to the host computer 12 by the billing computer 15. For this reason, the billing agency 13 may serially issue term limited authenticating certificates to the billing computer 15 in accordance with a predetermined schedule that is selected to ensure that an unexpired certificate is always in force, unless the billing agency 13 or the program supplier has decided to terminate the user's authorization to use the protected features of the program 11, such as for non-payment of the usage fees. To accommodate this methodology, the billing agency 15 stores the most recently received authenticating certificate for use as needed. Then, when an authorization message is received by the host computer 12, the protected program 11 first checks the expiration date of the authenticating certificate for received message against the current date according to the clock 16 to confirm that the certificate is unexpired prior to taking any further action in reliance upon the apparent authorization message. Advantageously, the protected program 11 includes code for causing the host computer 12 to contact the billing computer 15 for an authorization message each time the program 11 is initialized and/or periodically while the program 11 is running, thereby ensuring a more or less timely reassertion of the protection for the program 11 if the user's usage rights are revoked or expire.

Communications from the protected program 11 to the billing computer 15 generally are unsecure. For this reason, the billing computer 15 advantageously echoes and digitally signs all messages that it receives from the host computer 12 for the program 11. This enables the program 11 and the computer 12 to self-authenticate messages the billing computer 15 believes were received from them because the echoed messages are returned to the host 12 via an authenticated channel (i.e., in messages that are digitally signed by the billing computer 15).

For thwarting "replay" attacks against the protection for the software 11, random information, such as a so-called "nonce," is beneficially included in each message that is sent to the billing computer 15 under the control of the protected software 11. This nonce suitably is supplied by the software 11 through the use of a random number generating routine. The billing computer 15, in turn,echos this random information for return to the program 11 as described above.

In the illustrated embodiment, credit is extended to the user because the usage fees are computed by the billing agency 13 on the basis of the usage data that is accumulated by the billing computer 15. Thus, an unscrupulous user could avoid paying usage fees by destroying the billing computer 15 before the usage data is communicated to the billing agency 13. For this reason, the billing computer 15 might be programmed to enforce a credit limit on the user.

In operation, the billing agency 13 notifies the billing computer 15 in a digitally signed message when payments on the user's account are received. This enables the billing computer 15 to maintain a running credit balance on the user's account. Consequently, any balance due on the user's account can be aged by the billing computer 15 through the use of the clock 16. Thus, delinquency rules may be programmed into the billing computer 15 for determining whether future requests for authorization to use the protected program 11 on the host computer 12 should be honored or denied. As will be recalled, denying a re-authorization request effectively terminates the host computer's ability to execute the protected features of program 11 and, therefore, is a useful mechanism for enforcing the program supplier's rights.

If desired, the protected program 11 can include code for negotiating the terms and conditions for use of the protected features of the program 11 with prospective users. For example, the protected program 11 might include code for presenting a prospective user with one after another of a plurality of feature and price differentiated sets of terms and conditions for usage of the program 11, thereby giving the prospective user the freedom to "accept" any one or none of these "offers." Or, the code for these preliminary interactions with prospective users might provide a menu of individually priced, user selectable features of the program 11. The accounting routines and the authorization protocols that are used by the billing computer 15 to manage these negotiated transactions would be designed to provide the differentiation that is necessary to discriminate between the different options the users may select, but otherwise these negotiated transactions are governed by the same general principles as the simple commercial applications that are described above.

Figure 3:
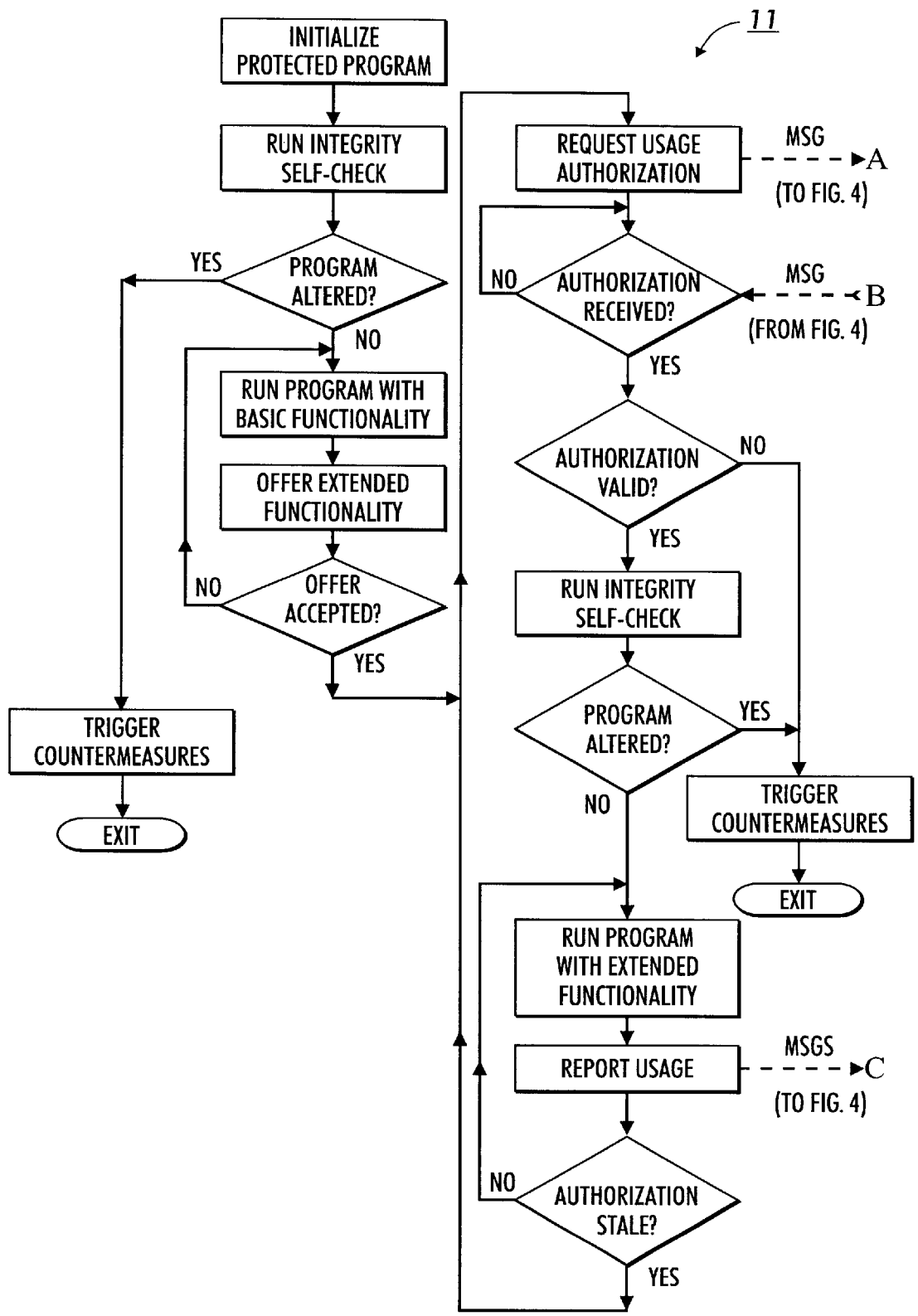
FIGS. 3–5, are simplified logical flow diagrams for a protected program, a billing agency and a billing computer, respectively, which communicate (as indicated by the dashed lines) to carry out a version of this invention.
Figure 4:
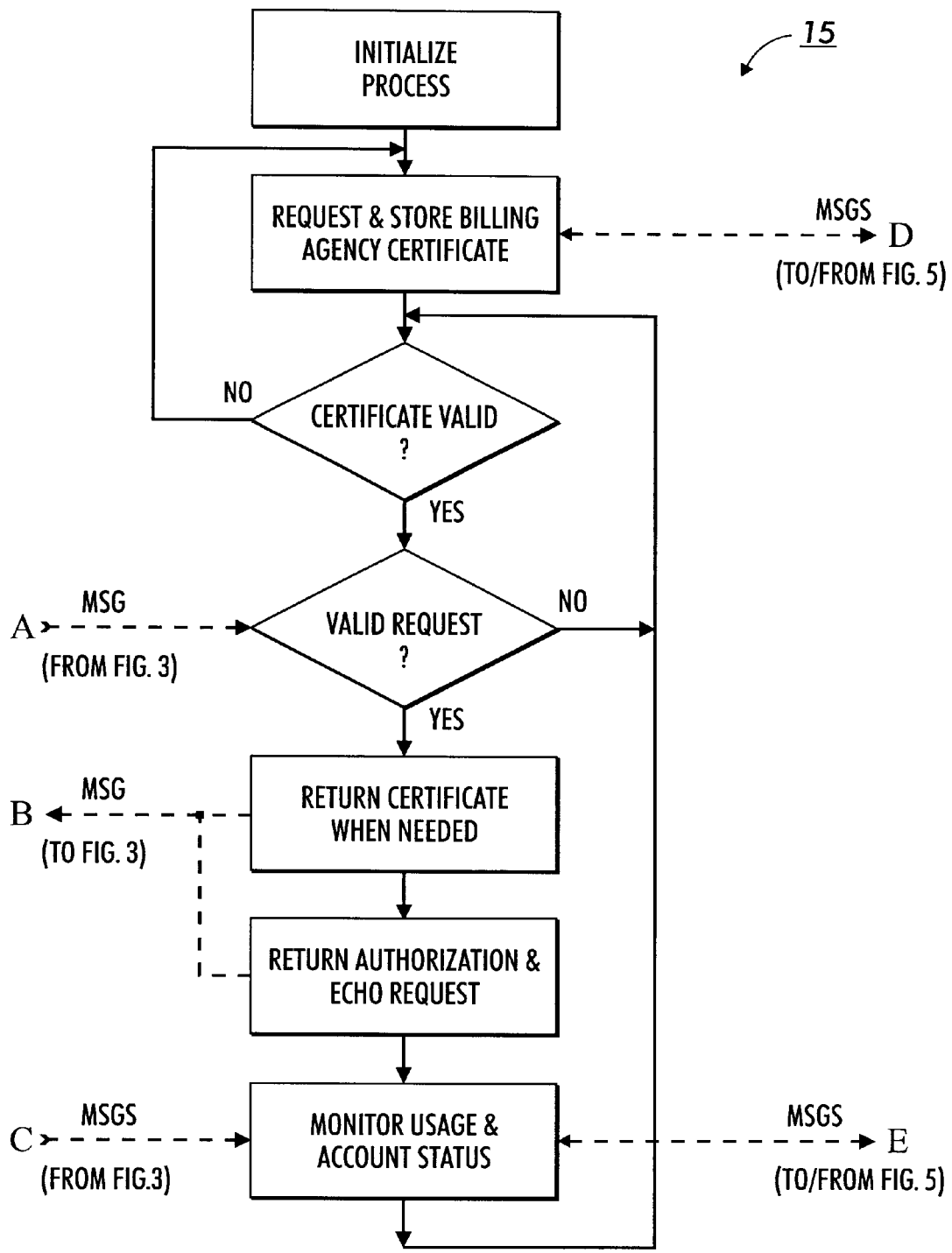
Figure 5:
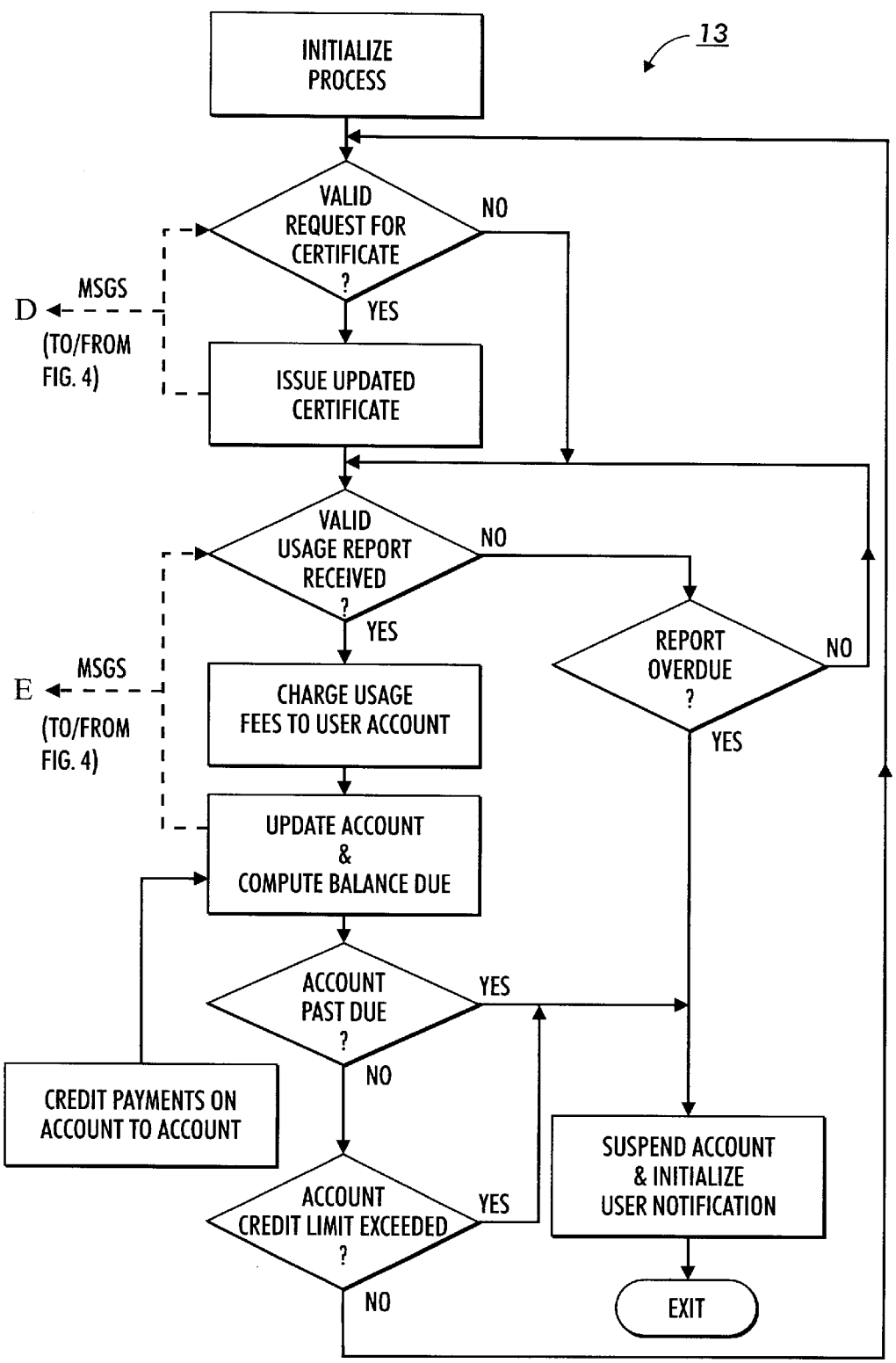

An embodiment of the invention is illustrated by the simplified logical flow diagrams that are depicted by FIGS. 3–5 (the messages that are exchanged by these processes are depicted in dashed lines). As will be appreciated, the billing agency 13 is a trusted surrogate for the shareware supplier and, therefore, can be viewed as being one in the same with shareware supplier, unless the billing agency 13 is servicing more than one shareware supplier. The billing computer 15, on the other hand, is a tamper resistant agent of the shareware supplier, so it is subservient to the billing agency 13 (i.e., the billing agency is the superior authority). Alternative embodiments that are consistent with this general framework will readily suggest themselves. For example, significantly more authority for managing the reaction of the protected shareware 11 to the behavior of the user is delegated to the billing computer 15 in the embodiment shown in FIGS. 1 and 2 than in the embodiment shown in FIG. 3. Different designers may have differing views on the desirability of centralizing or delegating various aspects of this management control. If there is a generally agreed upon division of responsibilities between the billing agency 13 and the billing computer 15, then the same billing computer 15 and the same billing agency 13 can be employed to service multiple shareware offerings of the same or different suppliers by simply extending the same general support framework to each of those offerings.

CONCLUSION

In view of the foregoing, it will be understood that this invention effectively provides a low cost software distribution technique which has many of the most desirable characteristics of the existing shareware distribution model, but which has the advantage of more strongly enforcing the program supplier's rights, such as the right to be paid usage fees in commercial applications.

What is claimed is:

1. A method for protecting a computer program from unauthorized use independently of any methodology for distributing the computer program to prospective users, the computer program including an embedded protective code, the method comprising the steps of:

(a) inhibiting via the embedded protective code at least one functional feature of the computer program from running on a user computer until the user computer receives an authorization message that is digitally signed by an authorized party using a secret signing key, the secret signing key being associated with a public checking key;

(b) providing the embedded protective code with access to the public checking key;

(c) running an integrity self-check over the computer program to confirm that the computer program is in an anticipated state, the integrity self-check being embedded in the computer program;

(d) communicating the authorization message to the user computer;

(e) applying the public checking key to the authorization message for authenticating it; and (f) enabling said functional feature to run on the user computer if the authorization message is authenticated and if the integrity self-check result confirms that the computer program is in the anticipated state.

2. The method of claim 1 wherein the authorization message is supplied by an agent and is digitally signed by the agent using a first secret signing key;

the agent's authority to issue the authorization message is certified by a superior authority using a certification that is signed with a second secret signing key and which authenticates a first public checking key for the first signing key, the second secret signing key being associated with a second public checking key;

the certification is communicated to the computer program;

the embedded protective code in the computer program has access to and is able to authenticate the second public checking key for the second secret signing key, the embedded protective code using the second public checking key to authenticate the certification.

3. The method of claim 2 wherein the second public checking key for the second secret signing key is embedded in the computer program, and wherein the integrity self-check authenticates the second public checking key.

4. The method of claim 2 wherein the agent participates in a commercial transaction with one of the prospective users to offer the prospective user an opportunity to run said functional feature of the computer program in return for certain consideration and to monitor the user's payment of said consideration if said offer is accepted.

5. The method of claim 4 wherein the second public checking key for the second secret signing key is embedded in the computer program, and wherein the integrity self-check authenticates the second public checking key.

6. The method of claim 5 wherein the commercial transaction involves a multiple option offer which covers multiple functional features of the computer program and multiple pricing plans.

7. The method of claim 2 wherein said superior authority is a billing agency.

8. The method of claim 7 wherein said agent is a special purpose billing computer.

9. The method of claim 8 wherein the special purpose billing computer is directly coupled to the user computer.

10. The method of claim 8 wherein each of the billing agency and special purpose billing computer has a priori knowledge of the other's public checking key so that each can validate the other's messages upon receipt.

11. The method of claim 2 wherein the superior authority is a source of the computer program.

12. The method of claim 1 wherein the integrity self-check includes a check sum routine.

13. The method of claim 1 wherein the public checking key is included in the computer program.

14. The method of claim 1 wherein the embedded protective code controls functionally of the computer program in accordance with predetermined rules.

* * * * *